United States Patent [19]

Tetzlaff

[11] Patent Number: 4,698,189
[45] Date of Patent: Oct. 6, 1987

[54] METHOD FOR THE MANUFACTURE OF VITREOUS CARBON BODIES

[75] Inventor: Ernst Tetzlaff, Heidenheim, Fed. Rep. of Germany

[73] Assignee: SIGRI GmbH, Meitingen bei Augsburg, Fed. Rep. of Germany

[21] Appl. No.: 820,192

[22] Filed: Jan. 17, 1986

[30] Foreign Application Priority Data

Jan. 18, 1985 [EP] European Pat. Off. ........ 85100496.0

[51] Int. Cl.$^4$ ........................................... B29C 71/04
[52] U.S. Cl. ..................................... 264/22; 156/73.1; 264/29.1; 264/29.6; 264/29.7; 264/211.12; 264/236; 264/328.18; 423/445; 423/447.4; 423/448; 423/449
[58] Field of Search ................. 264/22, 25, 29.2, 29.4, 264/29.6, 29.7, 211.12, 236, 328.18; 423/447.2, 447.4, 445, 449, 448; 522/162; 156/73.1

[56] References Cited

U.S. PATENT DOCUMENTS

| | | | |
|---|---|---|---|
| 3,374,102 | 3/1968 | Wainer et al. | 264/29.6 |
| 3,446,593 | 5/1969 | Moutaud et al. | 264/29.7 |
| 3,558,276 | 1/1971 | Otani | 264/29.6 |
| 3,742,101 | 6/1973 | Ouchi et al. | 264/29.7 |
| 3,850,675 | 11/1974 | Miller | 522/162 |
| 3,914,395 | 10/1975 | Finelli et al. | 264/29.7 |
| 4,197,282 | 4/1980 | Bailly-Lacresse et al. | 423/447.2 |
| 4,252,592 | 2/1981 | Green . | |
| 4,366,191 | 12/1982 | Gistinger et al. | 264/29.6 |
| 4,410,381 | 10/1983 | Chapman, II | 156/73.1 |
| 4,558,957 | 12/1985 | Mock et al. | 156/73.1 |
| 4,572,753 | 2/1986 | Bach | 156/73.1 |

FOREIGN PATENT DOCUMENTS

| | | | |
|---|---|---|---|
| 2301802 | 8/1973 | Fed. Rep. of Germany | 522/162 |
| 2829234 | 1/1979 | Fed. Rep. of Germany . | |
| 0919823 | 2/1963 | United Kingdom | 522/162 |
| 921236 | 3/1963 | United Kingdom . | |
| 956452 | 4/1964 | United Kingdom . | |

OTHER PUBLICATIONS

Polymer Letters, John Willey & Sons, Inc., vol. 8, pp. 121-126 (1970).

*Primary Examiner*—Jeffery Thurlow
*Attorney, Agent, or Firm*—Herbert L. Lerner; Laurence A. Greenberg

[57] ABSTRACT

Manufacture of vitreous carbon bodies in which thermoplastic materials containing aromatic groups are formed into bodies, are thermally stabilized by irradiation with ionizing radiation and are carbonized by heating them in an inert atmosphere.

5 Claims, No Drawings

METHOD FOR THE MANUFACTURE OF VITREOUS CARBON BODIES

BACKGROUND OF THE INVENTION

1. Field of the Invention

The invention relates to a method for the manufacture of vitreous carbon bodies.

2. Description of the Prior Art

For the manufacture of carbon and graphite bodies, milled coke or other solids consisting substantially of carbon are, in general, mixed with a carbon-containing binder. The mixture is then molded and the blank is heated to convert the binder into coke connecting the carbon grains. Accordingly, the bodies are polygranular, as a rule anisotropic and, as a consequence of the binder pyrolysis, more or less porous. There has been no lack of attempts to manufacture more uniform bodies containing substantially only a single phase. It has been proposed, for instance, to harden and carbonize thermosetting plastics, to comminute the product, to mix it with a phenolic resin binder and to process it as usual into a carbon body. In spite of these more extensive procedures, the two-phase structure of the carbon body, characterized by the primary resin coke and the secondary binder coke, remains substantially preserved. A "monogranular" carbon body is obtained from thermosetting plastics which are processed into blanks and, after thermal or catalytic hardening, are carbonized by heating them to 1000° C. The product, which has greater strength than "polygranular" carbon and is substantially impermeable to gases and liquids, is designated as glassy carbon or vitreous carbon because of the glass-like fracture surfaces. In principle, any thermosetting plastic is suitable as the starting material for vitreous carbon, but phenolic resins (British Pat. No. 956,452), furane resins (British Pat. No. 921,236) and mixtures of these substances are predominantly used in liquid or powder form. Liquid resins are cast into molds for making the blanks. Resins in powder form are shaped by die-molding, predominantly hot-pressing, and the resins are hardened by gradually raising the temperature. The term "hardening" is understood to include all condensation and cross-linking reactions which make the resin body unmeltable, so that the bodies can be converted into carbon in a second process step without major changes in shape. For this purpose, the hardened blanks are heated in an inert or reducing atmosphere or in a vacuum to about 800° C. or more. The rate of heating and the maximum heating temperature depend substantially on the size and wall thickness of the blanks and the intended use of the vitreous carbon. Common are rates of about 1 to 5 K./h below about 600° C. and of about 30 K./h above this temperature limit. The maximum heating temperature is advantageously about 1000° C. and about 2800° C. for "graphitized" vitreous carbon.

A weighty disadvantage of the described manufacture of vitreous carbon bodies is the poor formability of thermosetting resins as compared with thermoplastic materials. The forming processes are comparatively expensive and hardly suitable for the manufacture of elongated bodies such as tubes, strips and the like. While it is known to extrude compounds containing granular and fibrous fillers and to produce elongated blanks, this method is less well suited for processing resin types without filler. The fluidity variations in extruding thermosetting resins without filler, which are hardly controllable technically, cause large deviations in dimensions and, above all, lead to a high percentage of rejects due to the formation of cracks in the carbonization stage.

SUMMARY OF THE INVENTION

It is therefore an object of the invention to eliminate the limitations in form and dimensions in the manufacture of vitreous carbon bodies due to the comparatively poor formability of thermosetting resin.

With the foregoing and other objects in view, there is provided in accordance with the invention a method for the manufacture of vitreous carbon bodies from thermoplastic materials, which comprises, forming a thermoplastic material containing aromatic groups into a body, subjecting the body to ionizing radiation to thermally stabilize the body, and heating the thermally stabilized body in an inert atmosphere to carbonize the body.

Other features which are considered as characteristic for the invention are set forth in the appended claims.

Although the invention is illustrated and described herein as embodied in a method for the manufacture of vitreous carbon bodies, it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

DESCRIPTION OF THE PREFERRED EMBODIMENTS

According to the invention, the problem in the manufacture of vitreous carbon bodies due to the poor formability of thermosetting resins is solved by forming thermoplastic materials containing aromatic groups into bodies, the bodies thermally stabilized by irradiation with ionizing radiation and the thermally stabilized bodies carbonized by heating in an inert atmosphere.

The invention is based on the surprising insight that certain thermoplastic synthetics are thermally stabilized by irradiation with high-energy rays, i.e., they do not melt or get soft upon heating and can be converted with a sufficient carbon residue into vitreous carbon. As is well known, the formability of thermoplastic synthetics is very good and, as a rule, several shaping methods are available which make possible a technically satisfactory manufacture for all shapes and dimensions, i.e. the manufacture of tubes, bars, profiles, sheets, foils and the like, by extrusion or, in the case of hollow bodies, by injection molding. The invention opens up these processes for the manufacture of vitreous glass bodies which are thereby accessible more simply in complicated shapes and formats.

It is known to thermally stabilize thermoplastic materials such as polyacrylonitrile by heating in the presence of an oxidant. The rate of the diffusion-controlled cross-linking reaction, however, is so low that the method is used exclusively in the manufacture of carbon fibers, the filament diameter of which is only a few micrometers. The method is not suitable for the manufacture of vitreous carbon bodies. From German DE-OS No. 28 29 234 and related U.S. Pat. No. 4,252,592, it is also known to react epoxy resins used for the manufacture of fiber-reinforced composite bodies with a photopolymerisation catalyst and a cross-linking agent which can be activated by heat and to expose them in a thin layer to actinic radiation. A tough, plastic film is formed which flows around the reinforcement fibers and requires an additional thermal treatment for thermal stabilization. The irradiated epoxy resin therefore does not differ basically from other thermosetting materials, especially not with respect to the forming behaviour.

All thermoplastic synthetics which contain components of aromatic structure (benzene rings) such as aromatic polyesters, polycarbonate, polyterephthalates, polyacrylates, polyaryl -oxides, -sulfides and -sulfones, polyarylether ketones, mixtures of these substances are suitable for use in the method of the invention. Preferred are thermoplastics from the group polyphenylene oxide, polysulfone and polyether ether ketone which are characterized by a high coke yield of about 50%. Polyphenylene oxide is a thermoplastic, linear, non-crystalline polyether obtained by the oxidative polycondensation of 2,6-dimethylphenol in the presence of a copper-amine complex catalyst.

Polysulfones are sulfur-containing thermoplastics made by reacting bisphenol A and 4,4'-dichlorodiphenyl sulfone with potassium hydroxide in dimethyl sulfoxide. The structure of the polymer is benzene rings or phenylene units linked by three different chemical groups—a sulfone group, an ether linkeage, and an isopropylidene group. They may be processed by extrusion, injection molding and blow molding. The synthetics are plasticized in granular form at temperatures of about 300° C. and extruded into tubes, bars, profiles, sheets or foils or into less elongated parts such as crucibles, rings, spheres by injection molding. The blanks are then subjected to ionizing radiation and the synthetic material is cross-linked to an extent that the blanks do not melt or soften in the subsequent carbonizing treatment. Suitable radiation application to the thermoplastic synthetics are UV, beta, gamma and neutron radiation; beta rays are preferred because of the high effectiveness and easy handling. The energy dose is at least 1 MJ/kg and the radiation output is applied such that the softening temperature of the respective plastic is not reached in the blank prior to the cross-linking. To avoid an excessive temperature rise, it is advisable to apply the dose in several steps and to lower the temperature of the blanks between the irradiation steps. The unmeltable plastics cross-linked by the irradiation are carbonized in a known manner by heating them in an inert or reducing atmosphere or in a vacuum. The rate of heating, below about 600° C., is advantageously 3 to 8 K./h; it is somewhat lower for thick-walled blanks than for thin-walled bodies. The heating temperature should be at least 800° C.

For manufacturing vitreous carbon bodies with a foam-like structure, it is of advantage to terminate the irradiation of the blanks prior to the complete cross-linking of the plastic and to then heat the blanks in an inert atmosphere. The term "complete cross-linking" here does not describe the reaction mechanism of the plastic but the fluidity of the blank. Blanks which are not completely cross-linked soften partially during the carbonizing treatment; pores of larger or smaller size are formed, the share and size of which are determined by the degree of cross-linking and can easily be determined by preliminary tests. Foam-like vitreous carbon is particularly well suited as thermal insulating material for high temperatures because of its excellent heat insulation. According to another embodiment of the method, carbon fibers are added to the thermoplastic synthetic material, for instance in the form of short fibers or endless yarns which are mixed into the plastic or are worked-in by extrusion, rolling, casting or the like. The fiber content can be up to about 60% by volume and vitreous glass bodies are obtained which are reinforced by carbon fibers. Such bodies have greater strength than unreinforced vitreous glass bodies and are used especially for mechanically more highly stressed elements, for instance, for bearings, springs, brake discs and also nozzles.

The forming processes called primary molding are suitable for making the blanks from the thermoplastic synthetics. Forming by extrusion or injection molding is preferred. Larger parts are advantageously connected together by joining them prior to the cross-linking treatment and are carbonized as a unit. The same applies to parts with more complicated shapes which can be manufactured by primary molding only at high cost or not at all. A particularly advantageous joining method is butt-welding by sonics.

A very important advantage of the method according to the invention is the opening-up of the technically matured methods and devices customary for the manufacture of blanks from thermoplastic synthetics for the manufacture of vitreous carbon. Especially elongated blanks can be manufactured thereby substantially more simply and at lower cost. Larger or more complicated shapes are obtained from several blanks which are joined together by welding or cementing and are then cross-linked.

The following example further illustrate the invention:

EXAMPLE 1

Polysulfone (Tradename Udel ®P 3500) with an average molecular weight of about 35,000 was plasticized and plates with the dimensions 91×15×4 mm were injection-molded. The plates were irradiated with beta rays for thermal stabilization of the thermoplastic. The total dose was 2 MJ/kg which was applied in four parts, so that the temperature of the plates was at most 120° C. The plates were heated with a mean gradient of 3.7 K./h in a flowing nitrogen atmosphere to 1100° C. and cooled down to room temperature within 48 hours. The linear shrinkage in the direction of the edges was about 30% and the coke residue was about 44%.

The vitreous glass plates which appeared to be flawless, had the following properties at room temperature:
Bulk density: 1.46 g/cm$^3$
Flexural strength: 100 MPa
Modulus of elasticity: 28 GPa
Electric resistivity: 51 ohm-$\mu$m

EXAMPLE 2

Tubes made by extrusion of polyether sulfone (Tradename Victrex ®300P), mean molecular weight about 20,500, with an outside diameter of 40 mm and an inside diameter of 32 mm, were irradiated with beta rays. The total dose, which was applied in eight partial stages was 2.2 MJ/kg. The temperature of the tubes during the irradiation was always lower than 130° C. For the pyrolysis of the thermally stabilized thermoplastic material, the tubes were heated with a gradient of about 2.8 K./h to 1100° C. and then cooled down to room temperature within 48 hours. The linear shrinkage was about 30% and the coke residue was 42%.

The properties of the vitreous carbon tube at room temperature were as follows:

Bulk density: 1.41 g/cm$^3$
Electric resistivity: 53 ohm-$\mu$m
Thermal conductivity: 3.8 W/m.K

EXAMPLE 3

Crucibles made by injection molding of polyphenylene oxide with a carbon fiber content of 30%, a fiber length of about 0.8 to 2 mm, with a diameter of 80 mm, a height of 100 mm and a wall thickness of 4 mm were irradiated with a dose of 1.5 MJ/kg subdivided into four stages for cross-linking and thermal stabilization of the thermoplastic material, and heated to 1050° C. with a gradient of about 4 K./h for carbonizing the same. The residue was about 58% and the shrinkage about 25%. The vitreous carbon which had particularly high impact strength, had the following properties at room temperature:

Bulk density: 1.50 g/cm$^3$
Flexural strength: 140 MPa
Modulus of elasticity: 35 GPa There is claimed:

1. Method for the manufacture of vitreous carbon bodies from thermoplastic materials, which comprises, forming a thermoplastic material containing aromatic groups selected from the group consisting of polyphenylene oxide, polysulfone, polyether sulfone and polyether ether ketone into a body, irradiating the body with beta rays with an energy dose of at least 1 MJ/kg at a temperature below the softening temperature of the material and carbonizing the body by heating in an inert atmosphere to a temperature of at least 800° C.

2. Method according to claim 1, wherein the thermoplastic material body is irradiated with an energy dose which is applied in steps.

3. Method according to claim 1, wherein the body is irradiated with an energy dose insufficient for complete cross-linking.

4. Method according to claim 1, wherein carbon fibers are added to the thermoplastic material.

5. Method according to claim 1, wherein the thermoplastic material is shaped by extrusion or injection molding.

* * * * *